Patented Feb. 7, 1928.

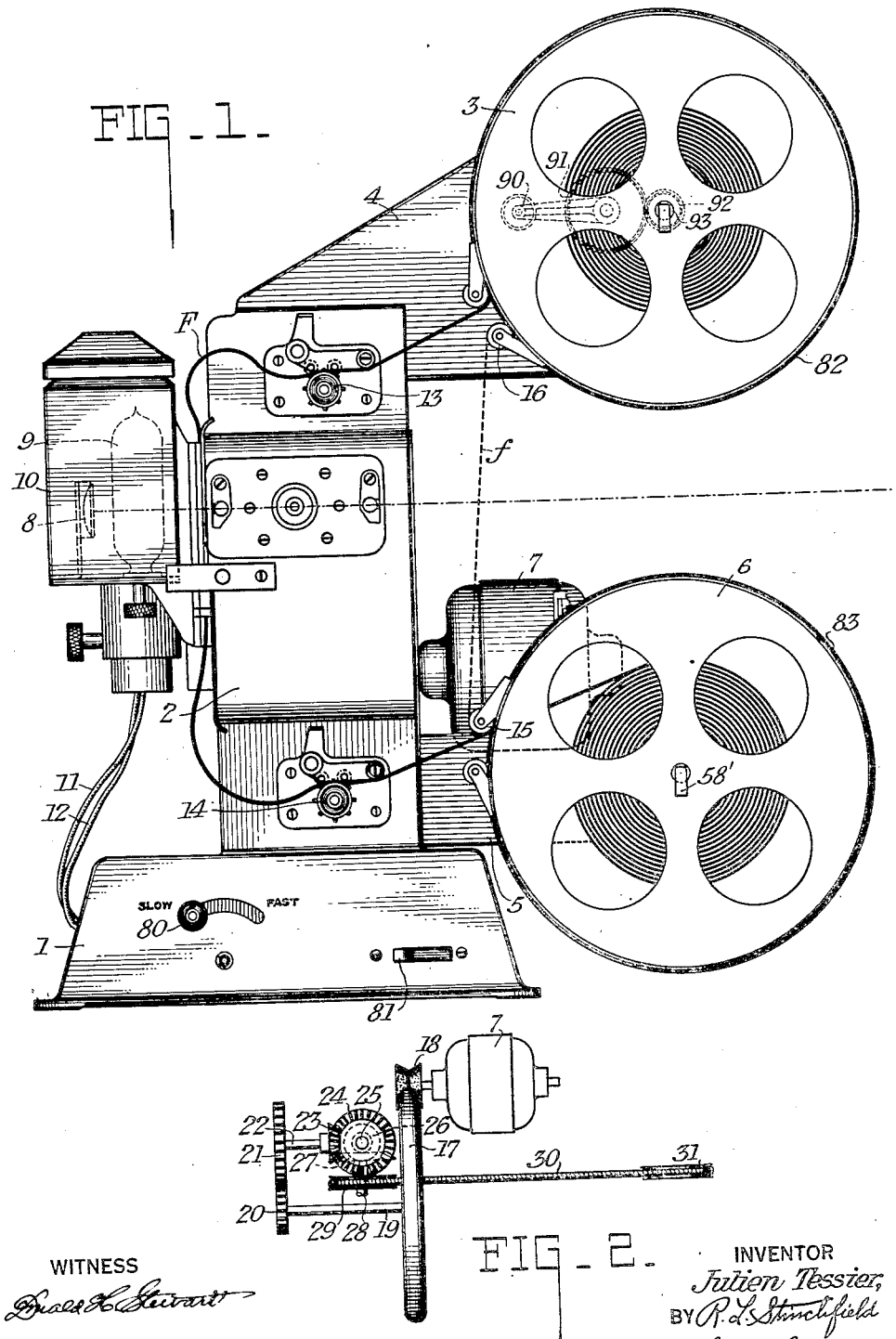

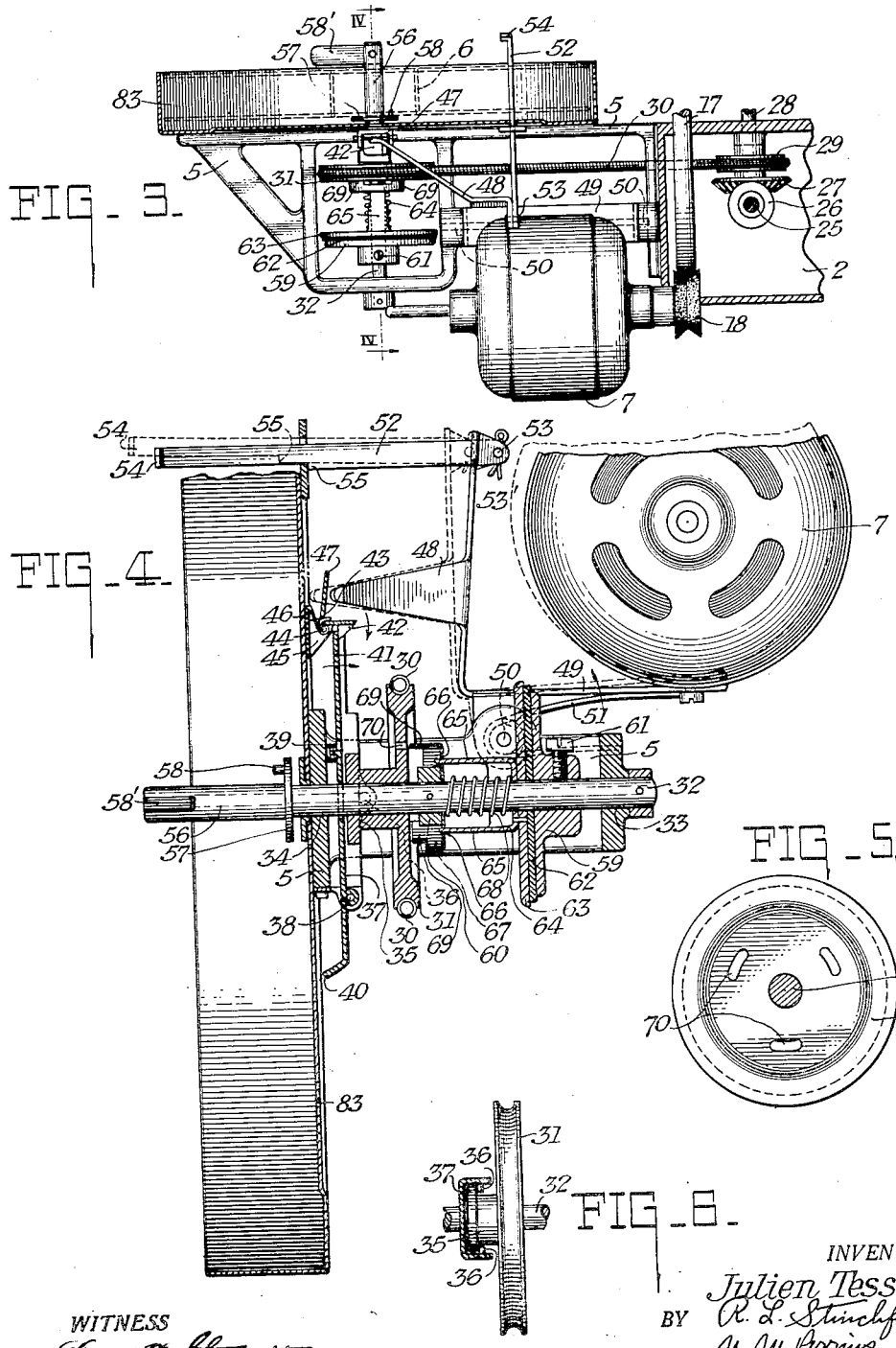

1,658,361

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Application filed September 8, 1922. Serial No. 586,910.

This invention relates to motion picture apparatus and more particularly to projecting mechanism of a simple type suitable for home or amateur use. On such a machine it is desirable that rewinding may be done without removing the film from the projector. To this end I have designed a projector in which the take-up drive may be disconnected and the film rewound by hand directly to the supply reel.

It would be quite possible for the user to neglect to reconnect the take-up drive before again commencing the operation of the machine. One of the principal objects of this invention is to avoid this and I have so constructed the projector that the disconnection of the take-up clutch necessarily renders the drive for the film advancing means inoperative. Other objects will appear from the specification, the novel features being particularly pointed out in the claims at the end thereof.

In the drawings in which like reference characters denote like parts throughout:

Fig. 1 is a side elevation of a projector constructed in accordance with and illustrating one embodiment of my invention;

Fig. 2 is a diagrammatic plan of certain driving parts;

Fig. 3 is a plan view of a portion of the projector;

Fig. 4 is a section on line IV—IV of Fig. 3;

Fig. 5 is a detail side elevation of a part of the clutch; and

Fig. 6 is a top plan of the same part.

The projector comprises a base 1 supporting a body portion 2 which encloses the pull-down mechanism and other movable parts. A supply reel 3 is carried in a magazine 82 mounted on a bracket 4 attached to the top of the housing 2, and a lower bracket 5 carries a magazine 83 for a take-up reel 6. In addition the lower bracket carries the motor 7 and associated parts to be hereinafter described.

The picture is projected by means of a beam of light directed by a reflector 8 from the lamp 9, these parts being enclosed in the lamp house 10. Wires 11—12 connect the lamp to the base 1, in which the control mechanism is preferably carried. Lever 80 regulates the speed of the machine and lever 81 controls the motor and lamp. The light beam passes through a film F drawn by suitable mechanisms including sprockets 13 and 14 from reel 3 to reel 6. To rewind the film it is threaded over rollers 15 and 16 as is shown in broken lines at *f*, and the upper reel 3 is revolved by hand crank 90 and gears 91 and 92 after disconnecting the power drive as will be hereinafter more fully described.

Referring to Figs. 2, 3 and 4, the motor 7 drives the flywheel 17 by a friction pulley 18. This wheel 17 preferably serves also as a shutter and is mounted upon a shaft 19. Gears 20, 21, shaft 22 and bevel gears 23 and 24 transmit power to vertical shaft 25, which in turn through bevel gears 26 and 27 transmit power to shaft 28 carrying pulley 29. A belt 30 connects pulley 29 to a second pulley 31 which drives the take-up reel.

Pulley 31 is mounted to slide freely upon a shaft 32 supported by the frame 5 at 33 and 34. A flanged hub 35 is a part of, or is affixed to pulley 31 and is engaged by pins 36—36 of lever 37 pivoted at 38 to the bracket 5, being normally pressed by a spring 39 in the direction shown by the arrow. A tail 40 forms a stop limiting this movement, and the opposite end 41 may be engaged by a latch 42 formed of a bell crank lever 43 hinged at 44 to the bracket 45 and being pressed by a spring 46 toward the lever. The end 47 may be engaged by arm 48 affixed to the motor carriage 49 hinged at 50 to bracket 5, and pressed by spring 51 in the direction shown by the arrow. A link 52 pivoted at 53 to an arm 53' integral with carriage 49 is for holding the carriage against the spring pressure. This is done by pressing inwardly upon the handle 54 moving the latch 55 from the position shown in broken lines to those shown in full lines Fig. 4. In this position the motor is inoperative for driving the machine, as pulley 18 is out of contact with wheel 17. It should also be noted that arm 48 of the motor carriage does not touch arm 47 of latch 42 when in this position, and that the latch 42 cannot be operated to hold arm 37 unless latch 55 is first operated.

The film reel 6 is supported on the end 56 of shaft 32 fitting up against flange 57 and upon the pin 58, being held upon shaft 32 by the usual type of latch 58'.

Shaft 32 is driven through one member 59 of a slip connection; member 59 is affixed to shaft 32 by a set screw 61. A friction washer 62 is between part 59 and the other slip connection member 63 which comprises a collar mounted to slide on the shaft having a yoke 64 attached thereto. The arms 65—65 of this yoke extend through apertures 66—66 of the clutch block 67 which is thrust from block 59 by the spring 68. A collar 60 pinned to the shaft limits the outward movement of block 67. This block has three arms 69 adapted to enter apertures 70 in pulley 31 when the pulley is thrust towards block 67 by the lever 37 when released from latch 42. Thus driving connection is broken when the parts are in the position shown in Fig. 4, in which position the rewinding of the film can take place, the upper reel being rotated by hand by means of a handle 90 and gears 91 and 92, the latter being attached to shaft 93 carrying reel 3. Gear 91 can be drawn from mesh with gear 92 when projecting.

It should also be noted that when latch 52 is released allowing the motor 7 to move into its operative or driving position, that latch 42 is tripped and pulley 31 is spring-pressed into contact with the arms 69 which will either immediately enter apertures 70 and thus be driven by the pulley or, if not in alignment with the apertures, they will ride on the surface of the pulley until the apertures are reached, at which time spring 68 will thrust the arms 69 into the apertures. In this way the machine cannot be operated without having the take-up mechanism operated by power. Also the operator only needs to adjust one lever, 55, to place the machine in condition for projecting the pictures.

To disconnect the motor drive and the take-up drive the handle 54 is moved inwardly until latch 55 holds the motor 7 from wheel 17; and arm 37 is then pushed under latch 42 so as to disconnect pulley 31 from the arms 69 which, through the slip connection 59—63, drives shaft 32 and with it the take-up reel.

It will thus be seen that I have provided a projector through which the film cannot be advanced unless the clutch driving the take-up reel is in operative condition.

While I have herein shown and described a preferred embodiment of my invention, it is obvious that numerous changes may be made; and I contemplate, as within the spirit of my invention, all such modifications and equivalents as fall within the scope of the appended claims.

Having thus described my invention, what I claim as new and desire to secure by Letters Patent is:

1. In motion picture apparatus, mechanism including means for advancing film, a rotating take-up member for said film, a motor, driving connections from said motor to said means and member, means for disconnecting said member from the rest of the mechanism leaving it free to spin, a separate means for disconnecting the film advancing means from the motor, and a connection between said two disconnecting means necessarily rendering said first named disconnecting means inoperative when the second named disconnecting means is inoperative.

2. In motion picture apparatus, means for advancing film through said apparatus and take-up means for said film after it has been advanced, a motor, a driving connection between said motor and said film advancing means and a driving connection between said motor and said take-up means, said connections being disconnectible and the second named connection including a disconnectible driving means between the film advancing means and the take-up means, the elements being so related that when said driving means is disconnected, the first named driving connection will also necessarily be disconnected.

3. In motion picture apparatus having a gate, means for advancing film past said gate, and take-up means for said film after it has passed said gate, a motor, a driving connection between said motor and said film advancing means, a clutch between said motor and said take-up means, and a latch for maintaining said clutch operative, connections between said latch and said driving connection whereby release of the latch to render the clutch inoperative will also render the driving connection inoperative.

4. In motion picture apparatus having a gate, means for advancing film past said gate and a rotating take-up member for said film after it has passed said gate, a motor, a disconnectible driving connection between the motor and the film advancing means, and a driving connection between the motor and the take-up member including a disconnectible driving element upon the disconnection of which the rotatable take-up member is free to spin, means for controlling the disconnection of the first named driving connection and also controlling the disconnectible driving element.

5. In motion picture apparatus having a gate, means for advancing film past said gate and take-up means for said film after it has passed said gate, a motor, a driving connection between the motor and the film advancing means, and a driving connection between the motor and the take-up means, said motor being mounted for adjustment to two positions, in one of which both connections are rendered inoperative and in the other of which both connections are operative.

6. In motion picture apparatus having a gate, means for advancing film past said gate and take-up means for said film after it has passed said gate, a motor, a driving connection between the motor and the film advancing means, and a driving connection between the motor and the take-up means, said motor being mounted for adjustment to two positions, in one of which both connections are rendered inoperative and in the other of which both connections are operative, and a latch for holding the motor in that position whereat the connections are operative.

7. In motion picture apparatus, means for advancing film through said apparatus, means for winding said film after it has been advanced, a frame shiftable to two positions, a motor on said frame, a driving connection between the motor and the film advancing means and comprising a member of fixed location and a member on and movable with the frame to and from operative connection with the other member, and a driving connection between the motor and the film winding means and comprising a clutch member of fixed location and a movable clutch member, said second clutch member being connected to the frame so as to be moved thereby.

8. In motion picture apparatus having means for advancing a film and take-up means for said film, common driving means for said film advancing mechanism and said take-up means, a clutch between said driving means and said take-up means, and means for necessarily rendering the film advancing means inoperative when the clutch is rendered inoperative.

9. In motion picture apparatus, a film advancing means, a film take-up means, a rotating member, a motor, a disconnectible driving connection between the motor and said member, a driving connection between the member and the film advancing means and a disconnectible driving connection between the member and the take-up means, and means preventing the last named driving connection from being disconnected when said first named driving connection is operatively connected.

10. In motion picture apparatus, film advancing means, film take-up means, a rotating member, a motor, a disconnectible driving connection between the motor and said member, a driving connection between the member and the film advancing means, a clutch connection between the member and the take-up means, a latch controlling the first named connection, said latch being operative to maintain the clutch operative when the first connection is operative.

11. In motion picture apparatus, a film advancing means, film take-up means, a motor, a disconnectible driving connection between said motor and the film advancing means, a driving connection between said motor and said take-up means including a clutch, a latch for holding the clutch in inoperative position, and means connected to said first named connection and operative to prevent the operation of the latch when the first named driving connection is operative.

12. In motion picture apparatus, a film advancing means, a film take-up shaft, a motor, a disconnectible driving connection between said motor and the film advancing means, a driving connection between said motor and said take-up shaft including a clutch, a latch for holding the clutch in inoperative position whereby the shaft is free to spin, and a control member having one position wherein it controls said first named connection to render it inoperative and having a second position wherein it controls said latch to render it inoperative.

13. In motion picture apparatus, a film advancing means, film take-up means, a motor, a disconnectible driving connection between said motor and the film advancing means, a driving connection between said motor and said take-up means including a clutch, a latch for holding the clutch in inoperative position, and a member controlling said first named connection and having one position wherein it renders said connection inoperative, and wherein it permits the operation of the latch, and having a second position wherein the first named connection is rendered operative and wherein it engages the latch to render it inoperative.

14. In a motion picture apparatus, mechanism including means for advancing film, two rotatable shafts adapted to have film reels seated thereon, a motor, driving connections from said motor to said means and to one of the shafts whereby film may be advanced through the apparatus and wound on a reel on said shaft, means for disconnecting said shaft from the rest of the mechanism leaving it free to spin, a separate means for disconnecting the film advancing means from the motor, a connection between said two disconnecting means necessarily rendering said first named disconnecting means inoperative when the second named disconnecting means is inoperative, and means whereby the other of the shafts may be turned, to rewind thereon film from a reel on the first shaft.

Signed at Rochester, New York, this 1st day of Sept. 1922.

JULIEN TESSIER.